US006977666B1

(12) United States Patent
Hedrick

(10) Patent No.: US 6,977,666 B1
(45) Date of Patent: Dec. 20, 2005

(54) FLAT PANEL DISPLAY USING DUAL CPU'S FOR AN AIRCRAFT COCKPIT

(75) Inventor: Geoffrey S. M. Hedrick, Malvern, PA (US)

(73) Assignee: Innovative Solutions and Support Inc., Malvern, PA (US)

( * ) Notice: Subject to any disclaimer, the term of this patent is extended or adjusted under 35 U.S.C. 154(b) by 42 days.

(21) Appl. No.: 09/390,051

(22) Filed: Sep. 3, 1999

Related U.S. Application Data

(60) Provisional application No. 60/099,191, filed on Sep. 4, 1998.

(51) Int. Cl.[7] .................. G09G 5/10

(52) U.S. Cl. .................. 345/690; 345/87; 345/618; 345/502; 701/14; 701/16

(58) Field of Search .................. 345/173–176, 345/112, 150, 115–117, 502–506, 133–134, 345/87, 204, 904, 60, 82, 618, 690, 589, 345/156; 340/963, 973, 974–975, 438; 701/9, 701/14–16, 120; 714/46–47, 11, 48, 25, 30; 434/30, 49; 178/18.03

(56) References Cited

U.S. PATENT DOCUMENTS

| | | | | | |
|---|---|---|---|---|---|
| 3,678,256 | A | * | 7/1972 | Harenberg, Jr. | 701/16 |
| 4,598,292 | A | * | 7/1986 | Devino | 340/973 |
| 4,599,070 | A | * | 7/1986 | Hladky et al. | 434/45 |
| 4,622,667 | A | * | 11/1986 | Yount | 714/11 |
| 4,635,030 | A | * | 1/1987 | Rauch | 340/945 |
| 4,673,356 | A | * | 6/1987 | Schmidt | 434/35 |
| 4,734,687 | A | * | 3/1988 | Jones | 345/618 |
| 4,740,779 | A | * | 4/1988 | Cleary et al. | 345/7 |
| 4,842,520 | A | * | 6/1989 | Dupont | 434/30 |
| 5,001,638 | A | * | 3/1991 | Zimmerman et al. | 701/14 |
| 5,009,598 | A | * | 4/1991 | Bennington | 434/30 |
| 5,224,861 | A | * | 7/1993 | Glass et al. | 434/35 |
| 5,240,416 | A | * | 8/1993 | Bennington | 434/30 |
| 5,260,874 | A | * | 11/1993 | Berner et al. | 701/33 |
| 5,446,659 | A | * | 8/1995 | Yamawaki | 340/438 |
| 5,453,939 | A | * | 9/1995 | Hoffman et al. | 340/438 |
| 5,467,271 | A | * | 11/1995 | Abel et al. | 702/5 |
| 5,490,783 | A | * | 2/1996 | Stephens et al. | 434/35 |
| 5,559,528 | A | * | 9/1996 | Ravid et al. | 345/618 |
| 5,616,030 | A | * | 4/1997 | Watson | 434/38 |
| 5,668,542 | A | * | 9/1997 | Wright | 340/971 |
| 5,739,769 | A | * | 4/1998 | Vladimir et al. | 340/945 |
| 5,854,625 | A | * | 12/1998 | Frisch et al. | 345/173 |
| 5,883,586 | A | * | 3/1999 | Tran et al. | 340/945 |
| 5,912,656 | A | * | 6/1999 | Tham et al. | 345/112 |
| 5,959,615 | A | * | 9/1999 | Yamade et al. | 345/173 |
| 5,988,902 | A | * | 11/1999 | Holehan | 400/479.1 |

(Continued)

*Primary Examiner*—Alexander Eisen
*Assistant Examiner*—Kimnhung Nguyen
(74) *Attorney, Agent, or Firm*—Cohen, Pontani, Lieberman & Pavane

(57) ABSTRACT

A thin flat panel display for aircraft cockpits. These displays use a dual CPU/graphics generator system to produce simulated aircraft instrumentation displays which are color coded to indicate when one of the graphic generators has not correctly received data from the aircraft system bus. The displays use standard graphic generators and CPUs, and do not require additional software. The displays also allow the aircraft systems to be continuously tested while the aircraft is on the ground. Moreover, the inventive systems include input touch devices which access external memories to display necessary flight and landing information which allow the cockpit crew to expand in detail the external information for display on the flat panels.

18 Claims, 3 Drawing Sheets

U.S. PATENT DOCUMENTS 6,067,484 A * 5/2000 Rowson et al. ............... 701/16
6,271,769 B1 * 8/2001 Frantz ........................ 340/963
6,281,810 B1 8/2001 Factor
6,314,366 B1 * 11/2001 Farmakis et al. ........... 703/201
6,317,059 B1 * 11/2001 Purpus et al. ............... 340/974
6,573,840 B1 * 6/2003 Norman et al. ............. 340/953

* cited by examiner

FLAT PANEL DISPLAY USING DUAL CPU'S FOR AN AIRCRAFT COCKPIT

RELATED APPLICATIONS

This application claims priority under 35 U.S.C. § 119 from provisional U.S. patent application Ser. No. 60/099,191, filed on Sep. 4, 1998 entitled FLAT PANEL DISPLAY USING DUAL CPU'S FOR AN AIRCRAFT COCKPIT.

BACKGROUND OF THE INVENTION

1. Field of the Invention

This invention relates generally to displays for aircraft instrumentation. More specifically, this invention relates to thin, flat panel displays that display representations of aircraft instruments in color.

2. Description of the Related Art

It is desirable to use a thin, flat panel display in an aircraft cockpit so that aircraft parameters, which have typically been displayed on analog or electronic instruments, can be simulated on the flat panel display to provide reliable aircraft information. Aircraft parameters such as altitude, air speed, pitch, roll, and fuel consumption can be simulated on a thin, flat panel display so that the cockpit crew can readily observe these parameters. These displays are usually composed of liquid crystal devices (LCD) which can output color images.

In flat panel displays, preferably LCD flat panel displays, which combine simulated displays of instruments, all of the simulated instruments must output images to the cockpit crew with the highest integrity. Prior attempts at producing the flat panel displays which are driven by a central processing unit and a video graphics accelerator have not made it possible to monitor the actual images on a flat panel which the flight crew uses as a reference. The complicated software has not yet been developed which would be needed to modify current graphics accelerators and central processing units to adequately insure that the flat panel displays do not output erroneous information. Accordingly, the art has not heretofore produced flat panel displays for aircraft instrumentation, which reliably provide aircraft parameters to cockpit crews. Moreover, other information which the crew must monitor during flight and landings is not even available today in a convenient electronic format so that the flight crew can easily and simply access it in a timely and safe fashion. For example, well-known "approach plates" which set out in detail the terrain over which the plane is flying contain detailed information about the terrain which must be examined by the crew during flight and landings. Typically, approach plates have been available only as foldable, hard-copy map-like papers that the crew sticks or pastes to an instrument in the cockpit. Needless to say, this is an inefficient and potentially dangerous manner in which to observe terrain information. Furthermore, since approach plates contain detailed information about the terrain, oftentimes the information is obscured and difficult to read since it exists only on the hard-copy. Recently, approach plates have been made available on compact discs, but the required compact disc players are not conveniently found in a cockpit so that the crew can electronically access the approach plates. Also, compact disc players do not have the capability to "zoom-in" on a desired area of the approach plate so that the information can be readily comprehended and interpreted by the flight crew.

Additionally, prior display and processing systems for cockpit crews have required detailed and time-consuming certification procedures by the Federal Aviation Administration (FAA) before such systems and software can be incorporated into a new aircraft flight system. Such certification procedures are quite costly and can hinder the development and utilization of new aircraft control and flight systems.

Moreover, prior flight control systems and display devices have not provided adequate diagnostic tools for the crew and maintenance personnel to test and verify the performance of the various flight systems which are typically displayed in the cockpit. In the past, such systems have been tested or monitored only when maintenance personnel have specifically run diagnostic procedures on the systems according to standard practices or maintenance routines. Therefore, long-term data is not provided, or even available, for flight systems which can aid in indicating and/or diagnosing sporadic or intermittent problems with the systems, thereby allowing maintenance and crew personnel to adequately address such issues for safety purposes.

Accordingly, there is a long-felt, but unresolved need, in the art for flat panel display systems which are readily implementable in current aircraft to display flight data to the crew in the cockpit. Such display systems should be robust and simply integrated into the cockpit environment so that the flight crew can rely on the data received from the display system with assurance of its credibility. It would be further beneficial if these systems were equipped with diagnostic procedures so that long-term data is developed to indicate the performance of the systems over long periods and diverse conditions. Furthermore, an easily certifiable system is desired. Such needs have not heretofore been achieved in the art.

SUMMARY OF THE INVENTION

The above referenced long felt needs are met, and problems solved, by flat panel display systems, preferably LCD flat panel display systems, provided in accordance with the present invention. In a preferred embodiment, the systems comprise at least two central processing units (CPU), each interfaced to a separate graphics generator having a color graphics accelerator. The CPUs are further interfaced to two aircraft system interfaces which receive aircraft system parameters, and convert them to digital data which can be used by the CPUs. Each of the graphics generators drive color outputs which are input to a video multiplexing circuit, which further drives an LCD, thin, flat panel display. By alternately feeding the flat panel display with the data from each graphics generator, gray indicia, pointers, displays and borders can be created around each of the simulated instruments shown on the flat panel. This is accomplished since the first of the CPU's drives only red images, while the second CPU drives only blue and green images. The combination of these three colors in the LCD flat panel display, will produce grayish white indicia, pointers, displays or borders around each of the simulated instruments when a video multiplexer receives the color data from the two CPUs, and is itself functioning correctly.

If either of the graphics generators, either of the CPUs, or either of the aircraft system interfaces are not properly outputting, or receiving data, or are not functioning properly otherwise, that particular graphics generator will drop out of the feed to the video multiplexer, or go out of phase with the other graphics generator. This will produce either red indicia, pointer and border, when the blue and green graphics generator is not outputting properly, or a cyan type color when the red graphics generator is not outputting properly or it will produce a fuzzy, pointer, collar and indicia with the colors separated to some degree to produce red and blue-green fringing. Since such a misalignment of graphics, or the failure of one graphics generator, means to the crew that the data may be false, when the cockpit crew observes that the grayish white indicia and/or border has changed to another color or is fuzzy, it will be alerted to the fact that it is potentially receiving erroneous data concerning the aircraft system parameters and prompt the crew to take corrective action.

The inventive flat panel displays are readily certifiable according to present and anticipated future aircraft standards promulgated by the FAA and other organizations since a minimal amount of new software must be written to implement these displays. Additionally, with the use of a preferred Monte Carlo statistical sampling routine, the aircraft systems associated with the flat panel display can be continuously tested while the aircraft is not flying to build a statistical database of instrument performance which can be analyzed for safety and efficacy purposes.

In a further preferred embodiment of the flat panel displays of the present invention, the displays access external data sources which can input meaningful information to the displays that is necessary for safe and effective flight. For example, electronic approach plates can be stored in an external compact disc drive, digital versatile disc drive, or some other external memory for display on the inventive panels. Still more preferably, the inventive flat panels may advantageously be equipped with input devices to select a desired position on a particular approach plate so that the panel can zoom-in on or -out of the position to display the position's details to the crew clearly and efficiently. Such input devices could be a standard capacitive input touch pad interfaced on the bezel of the flat panel display, a computer mouse, an input stylus, a track ball, a resistive film or other equivalent input device. Photosensors may also be used on the corners of the flat panel displays to detect color changes and provide further data integrity to the displays. Such features, benefits and advantages have not heretofore been achieved in the art.

These and other features of the present invention will become apparent from the following detailed description considered in conjunction with the accompanying drawings. It is to be understood, however, that the drawings are not drawn to scale and are designed solely for purposes of illustration and not as a definition of the limits of the invention, for which reference should be made to the appended claims.

BRIEF DESCRIPTION OF THE DRAWINGS

In the drawings, wherein like reference elements identify similar elements throughout the several views.

DETAILED DESCRIPTION OF THE PREFERRED EMBODIMENTS

Figure 1:
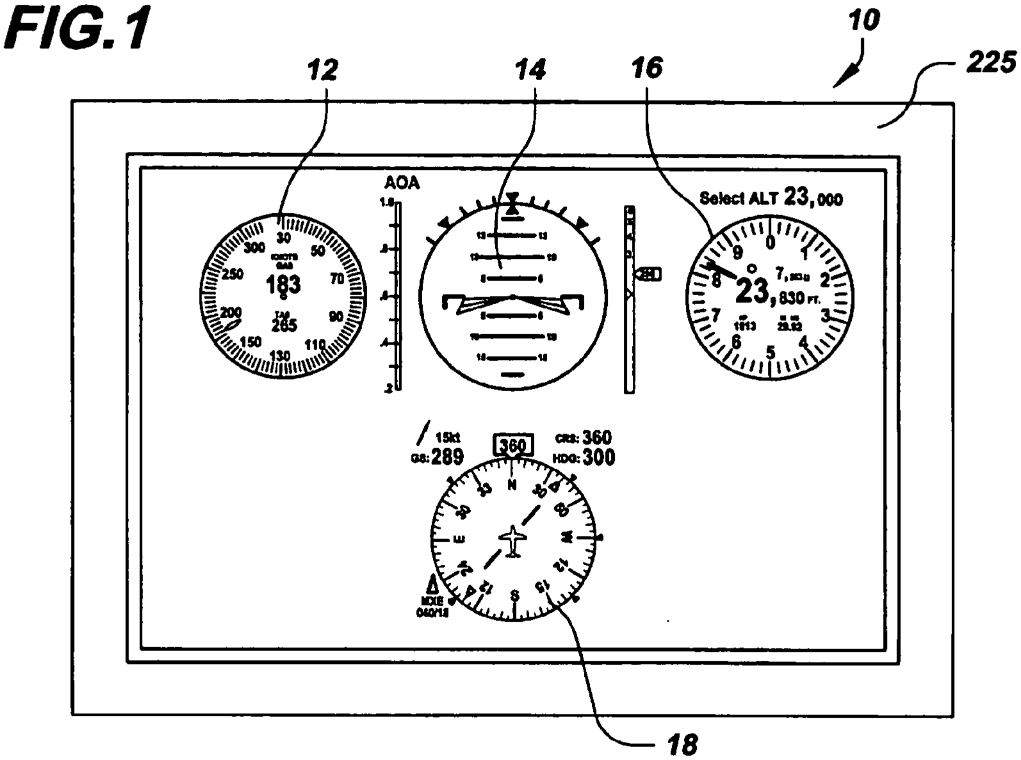
FIG. 1 is a schematic view of a flat panel display in accordance with the invention having various simulated aircraft instrumentation thereon.

Referring now to the drawings wherein like reference numerals refer to like elements, FIG. 1 shows a thin, flat panel display 10 for an aircraft cockpit. As shown, and as presently preferred, the display panel is a LCD panel, although many other flat panel displays such as, by way of example; plasma displays, thin film transistor screens, and field effect displays may be used. On the display 10, several simulated representations of aircraft instrumentation are found which a flight crew must monitor in order to safely fly the aircraft by way of example and not limitation, an airspeed indicator 12, an artificial horizon 14, an altimeter 16 and a compass 18. Of course, other flight instruments may be employed in lieu of or in addition to those shown by way of example. As can be seen in FIG. 1, most of the simulated instruments comprise separate, circular grayish white dials and pointers to indicate various aircraft system parameters. Several bar displays are also simulated which provide indications of other, different kinds of aircraft system parameters to the flight crew.

As shown and preferred, each of the simulated instruments in FIG. 1 have surrounding their borders a ring, or other type of border or collar which, when the display is functioning properly, is of a grayish white color. Since the LCD flat panel displays of the present invention are color displays, these grayish white indicia, pointers and borders or collars are, for example, composites of red, blue and green images, the standard colors of typical raster monitors, which conventionally sweep the data across the display and that have heretofore been used in the art. Of course other color combinations may be employed without departing for the invention. When one of the graphics generators, CPUs or aircraft system interfaces of the present invention ceases to output correct data, the indicia, pointers, borders or collars will change color, since that particular graphics generator will either be as a separate CPU to mix the color data received from each of the graphics generators 70, 80. In this case, appropriate software would be written to accomplish this task. Moreover, video multiplexer 90 may also comprise a digital mulitplexing circuit since modern flat panel displays are currently operative to directly receive and process digital data.

Advantageously, the use of at least two CPUs in accordance with the present invention greatly reduces the certification time of the software in the system since very little new, additional software must be written for CPUs 50, 60. Traditionally, when any new software or system comprising software is proposed for inclusion in an aircraft, FAA regulations and test procedures literally require that each line of code be independently verified for accuracy and functionality under all conditions. This requires simulating flight conditions in all possible permutations to ensure that the code does not fail at an unacceptable rate. Often, this involves months of testing and reporting to the FAA which is both time consuming and costly. By using standard CPUs with very little additional code in accordance with the present invention, this testing and foolproofing procedure can be greatly streamlined and reduced, thereby lowering the testing costs and expediting integration of the system into new and different aircraft. Such results have not heretofore been achieved in the art.

The display 100, and display in information, is monitored by alternately feeding display 100 with each CPU/generator data solution through video multiplexer 90. The grayish-white indicia, pointers and borders displayed around each simulated instrument of FIG. 1 are created since first graphics generator 70 outputs rod images, while second graphics generator 80 outputs blue and green images. It will be recognized by those with skill in the art that these two graphics generators can be interchanged without altering the scope of the invention. Likewise, if desired different selections of complementary colors could be employed. The graphics generators together scan at 75 Hz, that is 75 scans per second, wherein in a first second die fit graphics generator scans 37 times, and the second generator scans 38 times; and in the next second, vice-versa to maintain the scan of 75 Hz. This creates an average 37.5 scans per generator per second. In this way, the two CPUs and graphics generators combine colors to create a dimmed, white or gray indicia, pointer, and collar or border in and around each of the simulated instruments displayed in FIG. 1.

A failure of either of the display drivers 70 or 80 will therefore change the color of the indicia, pointer and border from gray to a primary color such as red, or some other composite color such as cyan in the case when the first graphics generator fails, or create a red-cyan color fringe when a misalignment occurs, or blue-green in the case where the second graphics generator fails. Misalignment will also result in some blurring of the indicia and pointer, and at least some color separation which causes fringing. A misalignment of the displays may cause an incorrect heading or pitch command to be outputted to the crew; a potentially dangerous condition. But with the change in color of this display by either a misalignment of the two color inputs, or the complete absence of one, the crew will be alerted to possible failures and will be able to take corrective action. It is preferable to synchronize at 105 the graphics generators 70 and 80 so that they scan correctly, and input to the video multiplexer 90 in synchronization. Alternatively, the video multiplexer 90 may be removed altogether which would then require that generator 70 only drive red, while generator 80 only drive green and blue, thereby eliminating the need for multiplexing and synchronization.

A series of photosensors 110 may also be provided which will appear as dots in the corners of LCD flat panel display 100 to sense a change in color of the indicia; pointer and/or collar, and to trigger an alarm which may be audible or visual or both, when the display is perceptibly off from its normal grayish white color.

Figure 3:
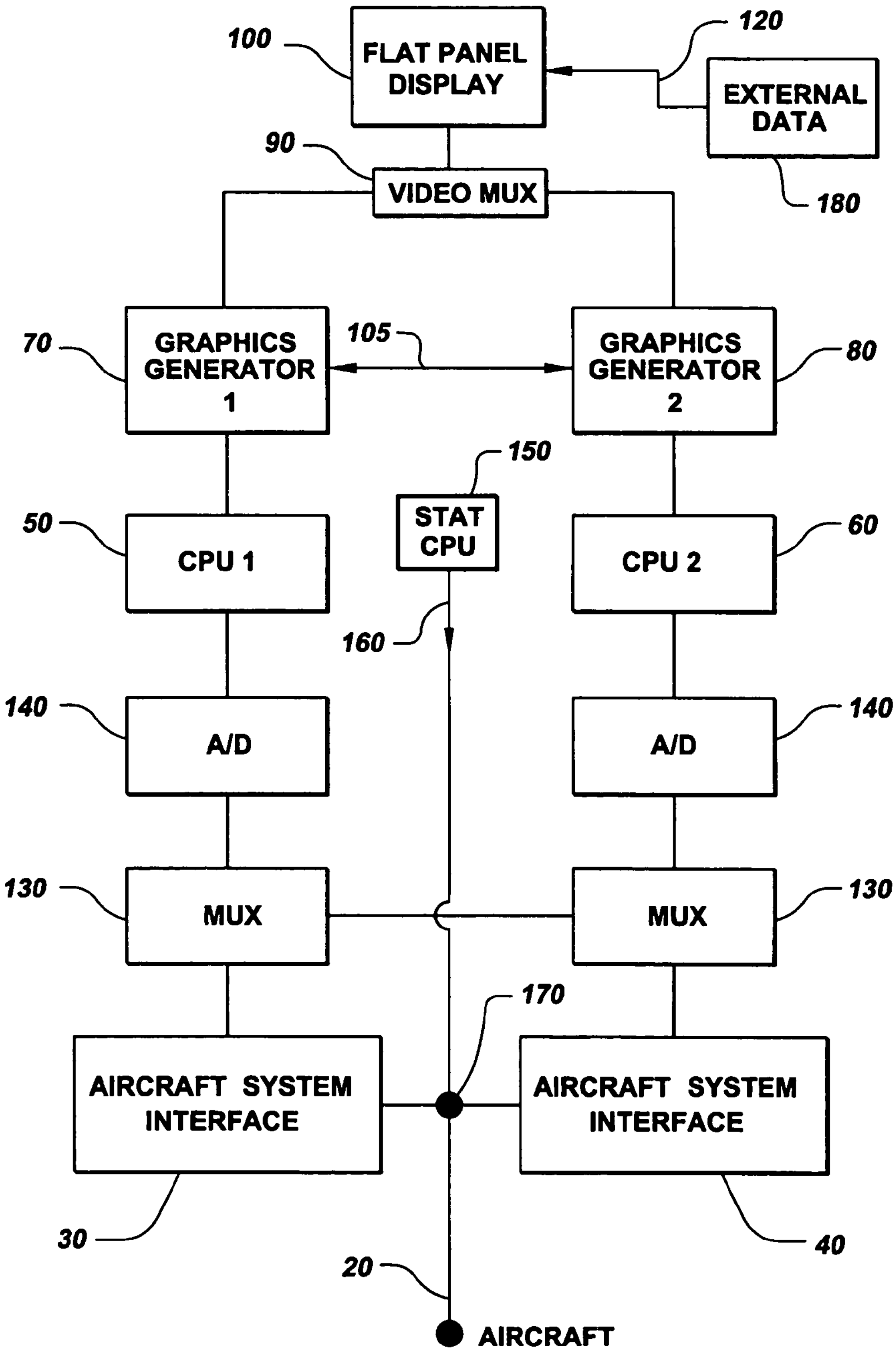
FIG. 3 is a block diagram of an alternative embodiment of a dual CPU, flat panel display system for aircraft in accordance with the present invention.

FIG. 3 depicts an alternative embodiment of a flat panel display 100 and circuit 120 for driving said flat panel display in accordance with the present invention. Circuit 120 preferably includes a pair of multiplexers 130 operable to receive analog signals from the aircraft interface circuits 30, 40 for integrating and processing the signals which are indicative of the states, e.g. airspeed, altitude, etc., of the aircraft instruments which should be monitored by the flight crew. The output of the multiplexers 130 are input to analog-to-digital (A/D) converters 140 for conversion of the multiplexed, analog signals to digital signals capable of being read and processed by CPUs 50, 60. It will be appreciated by those skilled in the art that any appropriate A/D and multiplexer circuits or components may be implementable in circuit 120 depending on the availability and/or desirability of using a particular make or brand of such circuits or components. Additionally, the use of such circuits or components will be constrained by their compatibility with other circuit elements in circuit 120. It will be further appreciated by those skilled in the art that circuit 120 may be implemented as an application specific integrated circuit (ASIC) wherein all of the circuit elements and their functionality may reside on one chip, or as a digital signal processor (DSP) chip wherein the various functions of the elements are programmed in firmware. All such embodiments and equivalents thereof are intended to be within the scope of the present invention.

In a preferred aspect of the invention, a third CPU 150 is provided to the system and serves an important function in that it runs a statistically based testing program which constantly interrogates all of the aircraft instrumentation associated with the flat panel display 100 when the aircraft is on the ground and under power. As known by those skilled in the art, an aircraft spends most of its time on the ground as opposed to in the air out of phase with, or outputting different data, the needed colors to make the grayish white combination (or whatever resultant color is selected), as will be described in greater detail hereinafter.

Figure 2:
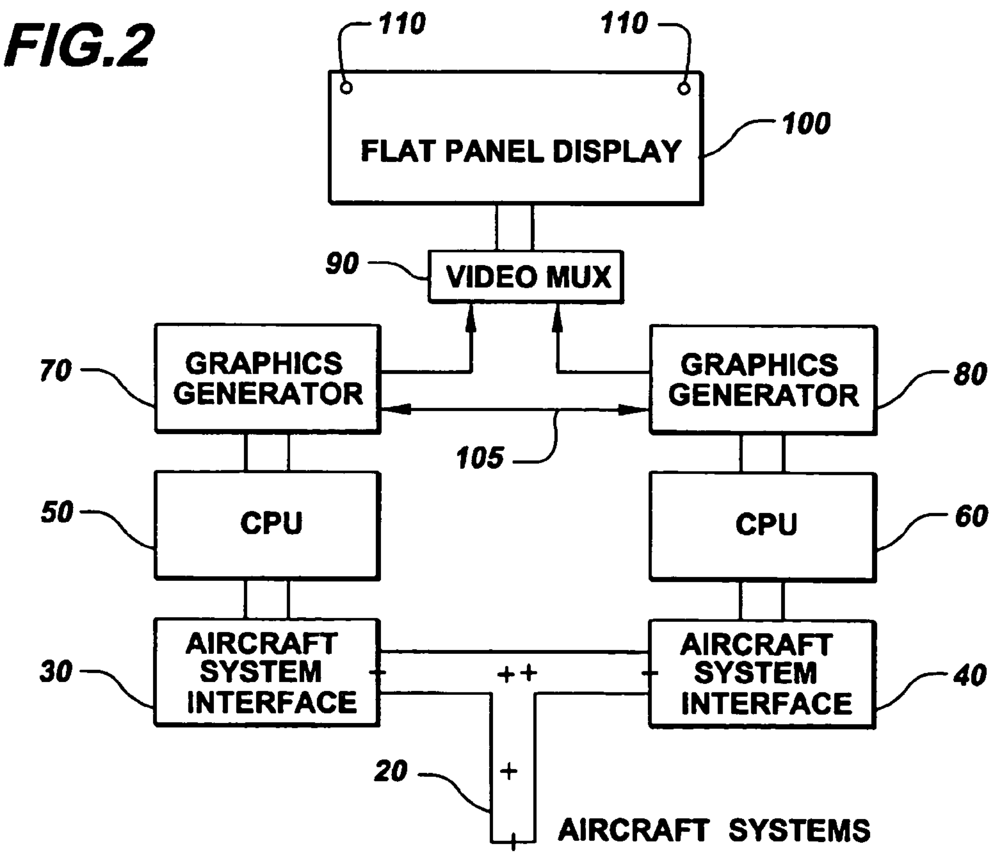
FIG. 2 is a block diagram of a dual CPU, flat panel display system for aircraft in accordance with the present invention.

Referring now to FIG. 2, an aircraft system bus 20 carries aircraft system parameters to two aircraft system interfaces 30 and 40. The aircraft system interfaces 30 and 40 convert the various parameters from bus 20 to digital data which can then can be input to CPUs 50 and 60 for processing. In accordance with the present invention, CPU 50 is preferably although not necessarily, of a different construction than CPU 60 to further enhance system reliability. For example, CPU 50 could be a Pentium chip, while CPU 60 a Power PC chip, or vise versa. In a similar manner, graphics generators 70 and 80 are each interfaced to the respective CPU 50 and 60, and are also preferably of a different construction, preferably having different graphics accelerator chips therein. The graphics generators 70 and 80 are preferably driven by different software codes, and may also be of a different design. It will be recognized by those with skill in the art that the various components, CPUs and graphics generators could be used on either leg of the system of FIG. 2, interchangeably.

Graphics generators 70 and 80 output and drive color images corresponding to the aircraft system parameters which have been processed by CPUs 50 and 60. In a preferred embodiment, graphics generator 70 outputs data in a red spectrum and feeds it to the video multiplexer 90. Similarly, graphics generator 80 generates data in green and blue spectrums as processed by CPU 60 and then feeds this data to video multiplexer 90. The video multiplexer conventionally multiplexes the red, green and blue colors received from the respective graphics generators 70 and 80, and conventionally outputs them to the thin, LCD flat panel display 100. It will be appreciated that video multiplexer 90 may be implemented and this presents an important opportunity to test the aircraft flight systems in an effort to gather statistically meaningful data about the systems' performance.

To this end, CPU 150 interrogates the aircraft systems by generating simulated aircraft data 160 which is input at 170 to the aircraft system interfaces 30, 40. These simulated flight data then are processed by the flat panel display system so that data is gathered in an acceptable statistical sample while the systems in the aircraft are artificially stimulated with signals 160 from the CPU 150 which simulate the need for the systems to perform their assigned functions. In this manner, CPU 150 then monitors and gathers continuously, or over a defined time period, the data output by each of the aircraft systems to be monitored. Signals 160 are both analog and digital signals and so the aircraft system interfaces 30, 40 preferably include the appropriate analog-to-digital, digital-to-analog and multiplexer components to handle these signals appropriately. The statistics and simulated data may ultimately be output to the flat panel display 100, or alternately output to some other appropriate output device such as a printer, storage medium, or other monitor.

By acquiring data in this manner over a sufficient period of time, an accurate and comprehensive performance picture can be obtained for each of the aircraft systems so monitored. This will allow the FAA, the owners of the aircraft, maintenance personnel and cockpit crew to obtain a realistic indication of the aircraft systems' performance under nearly genuine flight conditions. This will provide data not heretofore available to safety inspectors and engineers and will greatly improve the safety and performance of the aircraft. It will be further appreciated by those skilled in the art that the statistical testing routine described herein may alternately be implemented by either of CPUs 50, 60 alone or in combination when appropriate software is written for these CPUs.

Additionally, any manner of statistically accurate testing procedure can be employed by CPU 170. In a most preferred aspect of the invention, well-known statistical Monte Carlo routines are employable to interrogate and test the aircraft systems. However, it will be apparent that other statistically acceptable routines are also usable such as, without limitation, game theories, gaussian distributions, classical statistical theories, discrete theories, sampling theories and others. All such embodiments and their equivalents are intended to be within the scope of the present invention.

The present inventive flat panel displays also advantageously provide a mechanism by which the flight crew can examine external data necessary for safe and efficient flight and landings. External data can be stored in an external memory device 180 which may store the data in any appropriate format or medium. For example, and without limiting the invention in any way, external memory device 180 may be a compact disc player, digital versatile disc player, ROM, EEPROM, floppy disc, magnetic disc, optical disc, or any other appropriate storage and accessing device which will allow the crew to access the data. By way of further example, external memory 180 may be integrated with any of the CPUs of circuit 120, or may include its own processor and interface unit to communicate with the crew. External memory 180 will be further capable of storing any type of important flight information such as an aircraft navigation chart or approach plate necessary for safe and efficient retrieval and observation by the crew. Even more preferably, external memory 180 is a compact disc drive and the external data is a compact disc having stored thereon multiple approach plates which will be useful to the crew for landing the aircraft and flying over unfamiliar terrain.

Figure 4A:
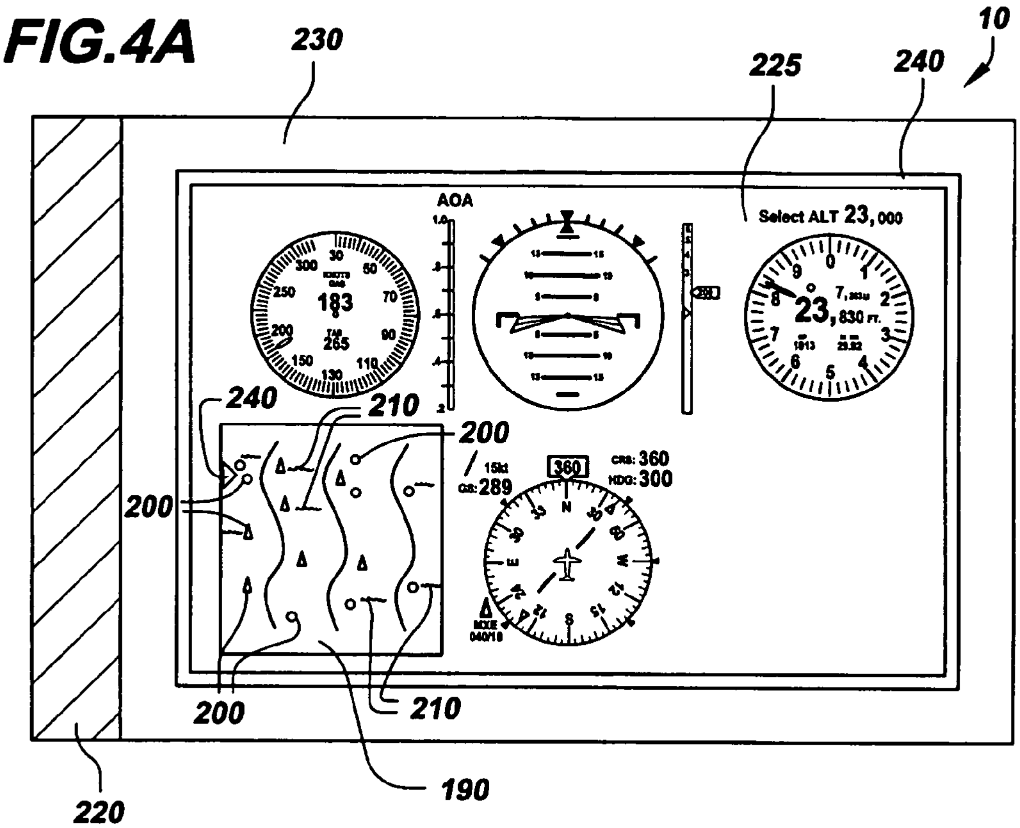
FIG. 4A depicts a flat panel display of the present invention operative to display an approach plate on the panel and having an input device that can select a particular position on the approach plate which can be examined in further detail.

Referring now specifically to FIG. 4A, flat panel display 10 has displayed thereon an approach plate which has been electronically accessed from compact disc player 180 and which contains thereon various terrain indicating markers 200 and text 210. The terrain indicating markers 200 set forth various and sundry terrain conditions such as high elevations, mountains, lakes, rivers and other relevant terrain conditions. The text 210 generally contains information about the specific terrain marker with which the text is associated.

Since the approach plate can contain a copious amount of terrain markers 200 and text 210, the text especially may be too small and difficult to read when flying the aircraft or performing other required cockpit tasks when the approach plate is in its initially displayed state on display 10. In order to overcome this problem, flat panel display 10 is preferably equipped with an input device 220 which allows the cockpit crew to pick a particular portion of the approach plate to be blown up and displayed on the flat panel 10 so that the desired details of the approach plate can be examined. Moreover, the other simulated instruments 12, 14, 16 oftentimes display information which is too small to be easily read by the flight crew and so it would be beneficial if the crew could zoom-in on specific areas of the instruments so that the specific areas could be blown up and the information found thereon be easily read.

To accomplish these tasks, input device 220 is mated to, or within a, bezel 230 surrounding the outer periphery of the display screen 225 of flat panel display 10 and which is operable to hold display screen 225 in a fixed position during flight. Input device 220 preferably is a capacitive touch pad such as that shown and described in U.S. Pat. No. 5,305,017, Methods and Apparatus for Data Input, the teachings of which are incorporated herein by reference. Other input devices may also be employed such as a standard computer mouse, a track ball, a resistive film, a stylus, a pointing stick and others. All such devices which respond to tactile inputs and equivalents thereof are intended to be within the scope of the present invention. The input device 220 is operative to both select from compact disc player 180 the particular approach plate which the flight crew desires to examine, and to zoom-in on and -out of particular positions on the approach plate to obtain greater, more detailed information about the terrain. Additionally input device 230 could also act as a cursor to be placed at any point on an instrument or the approach plate so the particular information on which the cursor is placed could be zoomed-in on and blown up so that the crew can read the data thereon.

Figure 4B:
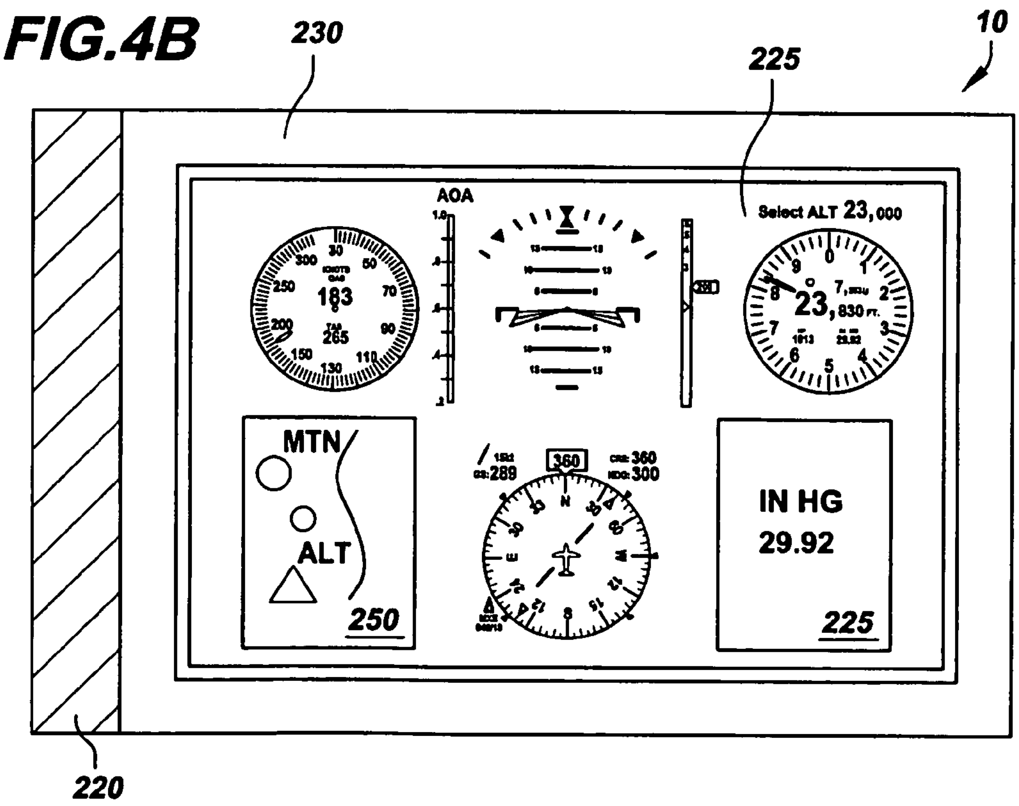
FIG. 4B depicts the flat panel display of FIG. 4A wherein a position on the approach plate has been selected by an input device and blown up on the display for detailed examination by the crew.

The cockpit crew conventionally manipulates the input device 220 to positionally select the area on approach plate 190 or other instrument from which it is desired to expand and examine. This area is chosen by an arrow or cursor 240 which will indicate the area of a particular dimension that should be chosen and expanded for display on on unused portions of flat panel 10. The system will then take the particular area of interest to be blown-up and display it in a convenient sized box. For example, with regard to the approach plate, a four inch high, by one inch wide area 250 (FIG. 4B) can be displayed corresponding to the area pointed out on the approach plate by cursor 240. By way of further example, if the cursor 240 is placed near the 29.92 IN HG on altimeter 16, this part of the altimeter can be expanded at 255 so that this level of mercury can be clearly displayed to the flight crew. It can be seen at 250 that the terrain markers 200 and text 210 are now expanded in greater detail and displayed on flat panel 10 such that is simple to view this information on flat panel 10. Moreover, it is now much easier to read text 210 and flight decisions will be more safely and efficiently made based on this information. It will be appreciated by those skilled in the art that the size and dimensions of expanded area 250 will be adjustable by using input device 220. Additionally, the placement on bezel 230 or in another place in the cockpit, and the particular of input device 220 to be used are a matter of design choice but should be geared for the ease and ergonomic comfort of the cockpit crew. Thus, the invention is not limited to a particular placement of the expanded position of the approach plate or on the type of input device utilized.

The thin flat panel displays of the present invention for aircraft cockpits provide a simple solution and outstanding integrity for aircraft instrumentation. These displays use standard graphics generators and CPUs, with standard software. Moreover, the inventive displays are easily certified in the complex safety environment of modern aviation and readily testable with the statistical techniques described above. The inventive flat panel displays also allow for display of many different kinds of important flight information which can be modifiable depending on the particular need by the cockpit crew for such information. Thus, these displays are economical and efficient. Such results have not heretofore been achieved in the art.

While there have been shown and described and pointed out certain fundamental novel features of the invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same result are within the scope of the invention. Substitutions of elements from one described embodiment to another are also fully intended and contemplated. It is the intention, therefore, to be limited only as indicated by the scope of the claims appended hereto.

What is claimed is:

1. A flat panel display system for displaying data relating to aircraft system parameters from corresponding aircraft instruments to a flight crew in a cockpit of an aircraft, comprising:

a flat panel display for visually displaying the aircraft system parameters on simulated instruments found on the flat panel display and for displaying indicia that said data is being received related to the aircraft system parameters from corresponding aircraft instruments;

a first central processor for receiving said data from the aircraft instruments measuring said aircraft system parameters;

a first graphics generator operatively coupled to the first central processor for generating a first set of color data as a function of the data received by the first central processor and for outputting the first set of color data to a location on the flat panel display so that the flat panel display can form the simulated instruments and the indicia;

a second central processor for receiving said data from the aircraft instruments measuring said aircraft system parameters; and a second graphics generator operatively coupled to the second central processor for generating a second set of color data as a function of the data received by the second central processor and for outputting the second set of color data to said location on the flat panel display in a different color than said first set of color data so that the combination at said location of the first set of color data from the first graphics generator and the second set of color data from the second graphics generator forms at said location on the flat panel display the simulated instruments and the indicia such that said indicia is of another color different from the colors of said first and second sets of color data, wherein when either of the first and second sets of color data is not output to said location on the flat panel display, the indicia on the flat panel display is in a color different from said another color.

2. The flat panel display system of claim 1, further comprising a video multiplexer circuit connected between the first and second graphics generators and the flat panel display for multiplexing and timing the output of the first and second sets of color data for output to the flat panel display.

3. The flat panel display system of claim 1, further comprising a third central processor for receiving data from aircraft instruments related to the aircraft system parameters and for interrogating the aircraft systems with simulated flight data on a statistical basis to build a database of statistical measurements of the aircraft systems for maintenance and diagnostic purposes.

4. The flat panel display system of claim 3, wherein the third central processor implements Monte Carlo statistics.

5. The flat panel display system of claim 3, further comprising an external memory device for storing external flight data that can be recalled by the flight crew and displayed on the flat panel display.

6. The flat panel display system of claim 5, further comprising an input device in communication with the external memory device for accessing the external data so that the external data can be displayed on the flat panel display.

7. The flat panel display system of claim 6, wherein the flat panel display further comprises a bezel surrounding a periphery of the flat panel display and wherein the input device is interfaced to the bezel.

8. The flat panel display system of claim 7, wherein the input device comprises a capacitive touch pad.

9. The flat panel display system of claim 8, wherein the external memory device comprises a compact disc player.

10. The flat panel display system of claim 9, wherein the external data comprises an aircraft navigation chart.

11. A circuit for controlling a flat panel display that displays on simulated aircraft instruments data related to aircraft system parameters gathered from aircraft instruments and indicia that show that the data is being received by the flat panel display, comprising:

a first central processor for receiving said data from the aircraft instruments measuring said aircraft system parameters;

a first graphics generator operatively coupled to the first central processor for generating a first set of color data as a function of the data received by the first central processor and for outputting the first set of color data to a location on the flat panel display so that the flat panel display can form the simulated instruments and the indicia;

a second central processor for receiving said data from the aircraft instruments measuring said aircraft system parameters;

a second graphics generator operatively coupled to the second central processor for generating a second set of color data as a function of the data received by the second central processor and for outputting the second set of color data to said location on the flat panel display in a different color than said first set of color data so that the combination at said location of the first set of color data from the first graphics generator and the second set of color data from the second graphics generator forms at said location on the flat panel display the simulated instruments and the indicia such that said indicia is of another color different from the colors of said first and second sets of color data;

wherein when either of the first and second sets of color data is not output to said location on the flat panel display, the indicia on the flat panel display is in a color different from said another color; and a third central processor for receiving data from aircraft instruments related to the aircraft systems parameters and for interrogating the aircraft systems with simulated flight data on a statistical basis to build a database of statistical measurements of the aircraft systems for maintenance and diagnostic purposes.

12. The circuit of claim 11, further comprising a video mulitplexer circuit connected between the first and second graphics generators for multiplexing and timing the output of the first and second sets of color data to the flat panel display.

13. The circuit of claim 12, wherein the third central processor implements Monte Carlo statistics.

14. The circuit of claim 13, further comprising an external memory device for storing external flight data that can be recalled by the flight crew and displayed on the flat panel display.

15. The circuit of claim 14, further comprising an input device in communication with the external memory device for accessing the external data so that the external data can be displayed on the flat panel display.

16. The circuit of claim 15, wherein the input device comprises a capacitive touch pad.

17. A color flat panel display system for displaying, to an aircraft flight crew in an aircraft cockpit, aircraft flight data for use by the flight crew in operating the aircraft based on flight data information input to the display system, said system comprising:

a color flat panel display screen for presenting to the flight crew an image representing the flight data, the flight data image being presented on the display screen in a presentation color selectively formed at each of multiple locations on the display screen by concurrently illuminating predetermined combinations of a plurality of color pixels on the display screen at said each location;

a first independent processor for receiving the flight data information supplied to the display system and operable for generating a first output to the display screen for illuminating a first subset of said plural color pixels at said each location;

a second independent processor for receiving the flight data information supplied to the display system and operable for generating a second output to the display screen, concurrent with said first output of the first processor, for illuminating a second subset of said plural color pixels at said each location to thereby present the flight data image on the display screen at said each location in said presentation color formed by concurrent illumination by the first and second processors of a combination of said first and second subsets of the plural color pixels at said each location.

18. A method of displaying, to an aircraft flight crew on a color flat panel display screen in an aircraft cockpit, an image of aircraft flight data presented to the flight crew on the display screen in a presentation color selectively formed at each location on the display screen by concurrently illuminating a predetermined combination of a plurality of color pixels at said each location, for use of the presented flight data image by the flight crew in operating the aircraft, said method comprising the steps of:

supplying flight data information to a first independent processor for generating, from the supplied flight data information, the flight data image as a first output for illuminating a first subset of the plural color pixels on the display screen at said each location;

supplying the flight data information to a second independent processor for generating, from the supplied flight data information, the flight data image as a second output for illuminating a second subset of the plural color pixels at said each location; and concurrently supplying the first and second outputs to the display screen so as to concurrently illuminate the first and second subsets of the plural color pixels at said each location of the display screen and thereby present the flight data image on the display screen at said each location in the presentation color formed by the concurrent illumination of the first and second subsets of the plural color pixels at said each location of the color flat panel display screen.

* * * * *